United States Patent
Agoncillo et al.

(10) Patent No.: US 8,297,635 B2
(45) Date of Patent: Oct. 30, 2012

(54) AUTOMATED RETRACTABLE STEP APPARATUS

(75) Inventors: Cielito B. Agoncillo, Newtown, PA (US); W. Brian McGinty, Huntingdon Valley, PA (US); Michael P. Ziaylek, Yardley, PA (US)

(73) Assignee: Michael P. Ziaylek, Yardley, PA (US)

( * ) Notice: Subject to any disclaimer, the term of this patent is extended or adjusted under 35 U.S.C. 154(b) by 392 days.

(21) Appl. No.: 12/798,545

(22) Filed: Apr. 6, 2010

(65) Prior Publication Data
US 2010/0264618 A1 Oct. 21, 2010

Related U.S. Application Data

(60) Provisional application No. 61/214,155, filed on Apr. 20, 2009.

(51) Int. Cl.
*B60R 3/02* (2006.01)
(52) U.S. Cl. ......................... 280/166; 280/163
(58) Field of Classification Search .............. 180/162, 180/163, 164.1, 164.2, 166, 169; 187/200, 187/201, 202; 105/444, 449; 296/162
See application file for complete search history.

(56) References Cited

U.S. PATENT DOCUMENTS

| | | | |
|---|---|---|---|
| 2,118,557 A | 5/1938 | Hamilton | |
| 2,492,068 A | 12/1949 | Schofield et al. | |
| 3,572,754 A | 3/1971 | Fowler | |
| 3,645,557 A | 2/1972 | Aldropp et al. | |
| 3,833,240 A | 9/1974 | Weiler | |
| 3,887,217 A | 6/1975 | Thomas | |
| 4,017,093 A | 4/1977 | Stecker, Sr. | |
| 4,020,920 A * | 5/1977 | Abbott | 182/19 |
| 4,073,502 A | 2/1978 | Frank et al. | |
| 4,106,790 A | 8/1978 | Weiler | |
| 4,110,673 A | 8/1978 | Nagy et al. | |
| 4,116,457 A * | 9/1978 | Nerem et al. | 280/166 |
| 4,180,143 A * | 12/1979 | Clugston | 182/91 |
| 4,185,849 A * | 1/1980 | Jaeger | 280/166 |
| 4,200,303 A | 4/1980 | Kelly | |
| 4,274,648 A | 6/1981 | Robins | |
| 4,412,686 A | 11/1983 | Fagrell | |
| 4,440,364 A | 4/1984 | Cone et al. | |
| 4,623,160 A | 11/1986 | Trudell | |
| 4,679,810 A | 7/1987 | Kimball | |
| 4,708,355 A | 11/1987 | Tiede | |
| 4,982,974 A | 1/1991 | Guidry | |
| 5,085,450 A * | 2/1992 | DeHart, Sr. | 280/166 |
| 5,228,707 A | 7/1993 | Yoder | |
| 5,342,023 A * | 8/1994 | Kuriki et al. | 267/64.17 |
| 5,342,073 A | 8/1994 | Poole | |
| 5,375,962 A * | 12/1994 | Kempf | 414/541 |
| 5,498,012 A | 3/1996 | McDaniel et al. | |
| 5,538,269 A | 7/1996 | McDaniel et al. | |
| 5,547,040 A | 8/1996 | Hanser et al. | |
| 5,842,709 A | 12/1998 | Maccabee | |
| 5,957,237 A | 9/1999 | Tigner | |
| 6,135,472 A | 10/2000 | Wilson et al. | |

(Continued)

*Primary Examiner* — John Walters
*Assistant Examiner* — James Triggs
(74) *Attorney, Agent, or Firm* — Sperry, Zoda & Kane

(57) ABSTRACT

A retractable step construction with a drive means for achieving powered or automatic retraction and deployment in motor vehicles to provide access onto or into the motor vehicle such as an emergency apparatus, for example a fire truck, usable in areas having limited vertical dimensions. This construction includes a housing assembly with guide channels adapted to receive a step assembly movably mounted thereinto controlled by the inclusion of a linkage assembly connected to the drive means and the step for powering deployment and retraction thereof.

20 Claims, 12 Drawing Sheets

U.S. PATENT DOCUMENTS

| | | |
|---|---|---|
| 6,213,486 B1 | 4/2001 | Kunz et al. |
| 6,641,158 B2 | 11/2003 | Leitner |
| 6,685,204 B1 | 2/2004 | Hehr |
| 6,830,257 B2 | 12/2004 | Leitner |
| 6,834,875 B2 | 12/2004 | Leitner et al. |
| 6,880,843 B1 * | 4/2005 | Greer, Jr. ............. 280/166 |
| 6,938,909 B2 | 9/2005 | Leitner |
| 6,942,233 B2 | 9/2005 | Leitner et al. |
| 7,007,961 B2 | 3/2006 | Leitner et al. |
| 7,055,839 B2 | 6/2006 | Leitner |
| 7,163,221 B2 | 1/2007 | Leitner |
| 7,168,722 B1 | 1/2007 | Piotrowski et al. |
| 7,219,911 B2 | 5/2007 | Sukonthapanich et al. |
| 7,367,574 B2 | 5/2008 | Leitner |
| 7,380,807 B2 | 6/2008 | Leitner |
| 7,398,985 B2 | 7/2008 | Leitner et al. |
| 7,413,204 B2 | 8/2008 | Leitner |
| 7,469,916 B2 * | 12/2008 | Watson ............. 280/166 |
| 7,503,572 B2 | 3/2009 | Park et al. |
| 7,971,891 B2 * | 7/2011 | Kircher ............. 280/163 |
| 8,151,715 B2 * | 4/2012 | Zandona' ............. 105/447 |
| 2004/0135339 A1 * | 7/2004 | Kim ............. 280/166 |
| 2007/0205573 A1 * | 9/2007 | Hallmark ............. 280/163 |

* cited by examiner

AUTOMATED RETRACTABLE STEP APPARATUS

The present utility application hereby formally claims priority of currently pending U.S. Provisional Patent application No. 61/214,155 filed Apr. 20, 2009 on "Automated Retractable Step Apparatus" filed by the same inventors listed herein, namely, Cielito B. Agoncillo, W. Brian McGinty and Michael P. Ziaylek, assigned to Michael P. Ziaylek, and said referenced provisional application is hereby formally incorporated by reference as an integral part of the present application.

BACKGROUND OF THE INVENTION

1. Field of the Invention

The present invention deals with the field of deployable steps and ladder systems attachable to vehicles to facilitate access to the interior thereof or to facilitate access to portions of the vehicle including entry and exit by personnel. These steps can also facilitate access to various portions of an emergency truck or to the fire truck where items are stored at elevated locations.

With this type of an application often there is a limited space available and the present invention specifically provides a drive means, a deployable step, as well as a housing for receiving thereof and deployment linkage which is oriented within a limited vertical dimension to facilitate placement in restricted areas available in the chassis or truck body of emergency vehicles such as fire trucks.

2. Description of the Prior Art

A number of retractable and deployable step systems have been disclosed in various patents such as shown in U.S. Pat. No. 2,118,557 patented May 24, 1938 to G. W. Hamilton on a "Retractable Step For Vehicles"; and U.S. Pat. No. 2,492,068 patented Dec. 20, 1949 to E. L. Schofield et al on a "Retractable Vehicle Step"; and U.S. Pat. No. 3,572,754 patented Mar. 30, 1971 to S. B Fowler and assigned to General Motors Corporation on a "Vehicle Step Arrangement"; and U.S. Pat. No. 3,645,557 patented Feb. 29, 1972 to A. Aldropp et al on a "Foldable Retractable Step Assembly For Campers And Like Vehicles"; and U.S. Pat. No. 3,833,240 patented Sep. 3, 1974 to R. C. Weller on a "Retractable Step For Use With Trailers, Motor Homes, Or Other Vehicles"; and U.S. Pat. No. 3,887,217 patented Jun. 3, 1975 to W. W. Thomas on a "Retractable Step For Vehicles"; and U.S. Pat. No. 4,017,093 patented Apr. 12, 1977 to A. Stecker on a "Vehicle Step"; and U.S. Pat. No. 4,020,920 patented May 3, 1977 to J. D. Abbott on a "Retractable Transit Coach Step"; and U.S. Pat. No. 4,073,502 patented Feb. 14, 1978 to R. C. Frank et al on a "Retractable Step"; and U.S. Pat. No. 4,106,790 patented Aug. 15, 1978 to R. C. Weller and assigned to Blackstone Manufacturing Co., Inc. on a "Vehicle Step"; and U.S. Pat. No. 4,110,673 patented Aug. 29, 1978 to E. J. Nagy et al and assigned to Kwikee Enterprises, Inc. on an "Extendable Vehicle Step And Step Motor Control System"; and U.S. Pat. No. 4,180,143 patented Dec. 25, 1979 to G. D. Clugston on a "Step For Vehicles"; and U.S. Pat. No. 4,185,849 patented Jan. 29, 1980 to W. J. Jaeger on a "Retractable Step For Motor Vehicle"; and U.S. Pat. No. 4,200,303 patented Apr. 29, 1980 to P. N. Kelly on a "Door-Operated Boarding Step For Trucks"; and U.S. Pat. No. 4,274,648 patented Jun. 23, 1981 to R. R. Robins on a "Vehicle Bumper Step"; and U.S. Pat. No. 4,412,686 patented Nov. 1, 1983 to E. T. Vagrell and assigned to AB Volvo on a "Folding Step For Vehicles"; and U.S. Pat. No. 4,440,364 patented Apr. 3, 1984 to S. S. Cone et al on a "Retractable Aircraft Step"; and U.S. Pat. No. 4,623,160 patented to J. W. Trudell on Nov. 18, 1986 on an "Extensible Step Assembly For Vehicles"; and U.S. Pat. No. 4,679,810 patented Jul. 14, 1987 to J. F. Kimball on a "Powered Step Assembly For Vehicles"; and U.S. Pat. No. 4,708,355 patented Nov. 24, 1987 to J. Tiede on a "Hideaway Vehicle Step"; and U.S. Pat. No. 4,982,974 patented Jan. 8, 1991 to W. L. Guidry and assigned to Interco Tire Corporation on an "Adjustable High Vehicle Boarding Step"; and U.S. Pat. No. 5,085,450 patented to L. DeHart, Sr. and assigned to The Dometic Corporation on Feb. 4, 1992 on a "Step Stall Prevention For Vehicle Steps"; and U.S. Pat. No. 5,228,707 patented Jul. 20, 1993 to C. T. Yoder and assigned to Carriage, Inc. on a "Retractable Vehicle Step"; and U.S. Pat. No. 5,342,073 patented Aug. 30, 1994 to R. L. Poole on a "Retractable Step For Motor Vehicles"; and U.S. Pat. No. 5,498,012 patented Mar. 12, 1996 to P. K. McDaniel et al and assigned to McDanial Manufacturing, Inc. on a "Convertible Vehicle Step"; and U.S. Pat. No. 5,538,269 patented Jul. 23, 1996 to P. K. McDaniel et al and assigned to McDaniel Manufacturing, Inc. on a "Convertible Vehicle Step"; and U.S. Pat. No. 5,547,040 patented Aug. 220, 1996 to P. E. Hanser et al and assigned to HWH Corporation on an "Automatic Step For Recreational Vehicles"; and U.S. Pat. No. 5,842,709 patented Dec. 1, 1998 to M. M. Maccabee and assigned to Kwikee Products Co., Inc. on a "Retractable, Swing Down Step Assembly"; and U.S. Pat. No. 5,957,237 patented Sep. 28, 1999 to R. H. Tigner and assigned to Specific Cruise Systems, Inc. on a "Motorized Collapsible Step"; and U.S. Pat. No. 6,135,472 patented Oct. 24, 2000 to K. Wilson et al and assigned to SportRack LLC on a "Motor Powered Running Board"; and U.S. Pat. No. 6,213,486 patented Apr. 10, 2001 to J. R. Kunz et al and assigned to Kwikee Products Co., Inc. on a "Step Assembly With Concealed Lower Tread"; and U.S. Pat. No. 6,641,158 patented Nov. 4, 2003 to H. Leitner and assigned to American Moto Products, Inc. on a "Retractable Vehicle Step"; and U.S. Pat. No. 6,685,204 patented Feb. 3, 2004 to I K. L. Hehr on a "Hitch-Mounted Extensible Step For Pickup Trucks And Other Vehicles Having Tailgates"; and U.S. Pat. No. 6,830,257 patented Dec. 14, 2004 to H. Leitner and assigned to American Moto Products, Inc. on a "Retractable Vehicle Step"; and U.S. Pat. No. 6,834,875 patented Dec. 28, 2004 to H. Leitner et al and assigned to American Moto Products, Inc. on a "Retractable Vehicle Step"; and U.S. Pat. No. 6,880,843 patented Apr. 19, 2005 to M. T. Greer, Jr. on a "Vehicle Step Device"; and U.S. Pat. No. 6,938,909 patented Sep. 6, 2005 to H. Leitner and assigned to 89908, Inc. on a "Retractable Vehicle Step"; and U.S. Pat. No. 6,942,233 patented Sep. 13, 2005 to H. Leitner et al and assigned to 89908, Inc. on a "Retractable Vehicle Step"; and U.S. Pat. No. 7,007,961 patented to H. Leitner et al and assigned to 89908, Inc. on Mar. 7, 2006 on a "Retractable Vehicle Step"; and U.S. Pat. No. 7,055,839 patented Jun. 6, 2006 to H. Leitner and assigned to 89908, Inc. on a "Retractable Vehicle Step"; and U.S. Pat. No. 7,163,221 patented Jan. 16, 2007 to H. Leitner and assigned to 89908, Inc. on a "Retractable Vehicle Step With Anti-Strike/Anti-Pinch Sensor System"; and U.S. Pat. No. 7,168,722 patented Jan. 30, 2007 to L. D. Piotrowski et al on a "Pull-Out Step Assembly For A Pickup Truck"; and U.S. Pat. No. 7,219,911 patented May 22, 2007 to D. Sukonthapanich et al and assigned to Ventra Group Inc. on a "Retractable Vehicle Step Assembly"; and U.S. Pat. No. 7,367,574 patented May 6, 2008 to H. Leitner on "Drive Systems For Retractable Vehicle Step"; and U.S. Pat. No. 7,380,807 patented Jun. 3, 2008 to H. Leitner and assigned to 89908, Inc. on a "Retractable Vehicle Step"; and U.S. Pat. No. 7,398,985 patented Jul. 15, 2008 to H. Leitner et al and assigned to 89908, Inc. on a "Retractable Vehicle Step"; and U.S. Pat. No. 7,413,204 patented Aug. 19, 2008 to H. Leitner and assigned to 89908, Inc. on a "Retractable Vehicle Step"; and U.S. Pat. No. 7,469,916 patented Dec. 30, 2008 to B. E. Watson and assigned to Magna International Inc. on an "Automated Deployable Running Board"; and U.S. Pat. No. 7,503,572 patented Mar. 17, 2009 to B. K. Park et al on a "Retractable Vehicle Step".

SUMMARY OF THE INVENTION

The present invention provides an automated retractable step apparatus wherein a housing assembly is provided defining a retaining zone therewithin. The housing assembly preferably includes a primary housing plate and a housing slot extending therethrough. The slot includes a first end and a second end positioned therein spatially disposed from one another. The housing assembly further includes a guide channel extending along the retaining zone defined within the housing assembly. This guide channel preferably includes a first guide channel and a second guide channel spatially disposed with respect to one another and extending longitudinally along the retaining zone. A thermoplastic guide member is positioned within the guide channel to facilitate gliding movement therewithin. The housing assembly further includes a step assembly movably engageable with respect to the guide channel thereof within the retaining zone of the housing assembly. The step assembly is movable along the guide channel between a retracted position within the retaining zone for storage and an extended position extending at least partially outwardly from the retaining zone to facilitate stepping upon the step assembly. The step assembly will further preferably include a step support affixed to the step assembly and extending therealong. The step support is movably engaged with respect to the guide channels of the housing assembly to facilitate guiding of movement thereof between the retracted position and the extended position. The step assembly also preferably includes a rear step surface defined thereon. The specific configuration of the step support includes a first step support member affixed to and extending longitudinally along the step assembly and engageable with respect to the first guide channel to facilitate guiding movement of the step assembly between a retracted position and the extended position. A second step support member is positioned spatially disposed from the first step support member for a similar purpose.

A linkage assembly is provided movably attached with respect to the step assembly which is operative to control movement thereof between the retracted and extended positions. This linkage assembly is adapted to extend through the housing slots and be movable therealong between the first end and the second end thereof. The movable attachment of the linkage assembly with respect to the step assembly will be operative to urge the step assembly to move to the extended position responsive to the linkage assembly being moved to a position within the housing slot which is adjacent to the first end thereof. Additionally the movable attachment of the linkage assembly with respect to the step assembly will preferably be operative to urge the step assembly to move to the retracted position responsive to the linkage assembly being moved to a position within the housing slot which is adjacent the second end thereof.

Preferably the linkage assembly includes a pivot support plate attached with respect to the housing assembly which extends outwardly therefrom. This pivot support plate will preferably define multiple apertures therein including a first pivot support plate aperture and a second pivot support plate aperture as well as a third pivot support plate aperture. The linkage assembly further includes a mounting bracket fixedly secured to the housing assembly. The pivot support plate will be attached to the housing assembly by being fixedly secured to the mounting bracket such that it extends outwardly therefrom. The mounting bracket is preferably fixedly secured to a primary housing plate of the housing assembly and the support plate is preferably fixedly secured to the mounting bracket. The second pivot support plate aperture and the third pivot support plate aperture are preferably positioned immediately adjacent the mounting bracket to facilitate securement of the pivot support plate with respect thereto. The first pivot support plate aperture is positioned spatially disposed from the mounting bracket.

The linkage assembly may further include a pivot pin extending through the first pivot support plate aperture outwardly away from the pivot support plate. Furthermore the linkage assembly will preferably include a first lower inner link arm pivotally attached with respect to the step assembly and extending outwardly therefrom. It will also preferably include a second lower inner link arm pivotally attached with respect to the first lower inner link arm and also pivotally attached with respect to the step assembly. This second lower link arm will extend outwardly away from the step assembly in a direction spatially disposed from the lower inner link arm and preferably at an angle with respect to thereto. Furthermore the linkage assembly will preferably include a first lower outer link arm pivotally secured to the first lower inner link arm and extending outwardly away from it. The linkage will further include a second lower outer link arm pivotally secured to the second lower inner link arm such that it extends outwardly away therefrom. This second lower outer link arm and the first lower outer link arm will both be pivotally secured with respect to the pivot pin as well as being pivotally secured with respect to one another.

The linkage will further include a first upper linkage arm pivotally attached to the drive and extending outwardly therefrom. This first upper link arm will be movable responsive to actuation of the drive. The linkage will further include a second upper linkage arm pivotally attached to the drive means to be movable responsive to actuation thereof. The second upper linkage arm will extend outwardly away from the drive in a direction spatially disposed from the first upper linkage arm.

The linkage will further include a first lower linkage drive pin attached to the first upper linkage arm to be movable therewith. The first lower linkage drive pin will be attached to the first lower outer link arm for powering movement of the linkage assembly to facilitate movement of the step assembly between the extended position and the retracted position as needed. Furthermore the linkage will include a second lower linkage drive pin attached to the second upper linkage arm to be movable therewith. This second lower linkage drive pin will be attached to the second lower outer link arm for powering movement of the linkage assembly to further facilitate movement of the step assembly between the extended position and the retracted position.

Furthermore the linkage of the present invention will further include a step bracket fixedly secured to the rear step surface and pivotally attached with respect to the first lower inner link arm and a second lower inner link arm in order to facilitate powering of movement of the step assembly between the extended position and the retracted position.

The linkage will additionally include a first securement pin extending through the second pivot support plate aperture to facilitate securement of the pivot support plate to the mounting bracket. Similarly a second securement pin will extend through the third pivot support plate aperture to further facilitate securement of the pivot support plate with respect to the mounting bracket.

A drive means may be included which preferably comprises a linear actuator which is operatively attached to the linkage assembly which is operative to power movement of the step assembly between the extended position and the retracted position.

It is an object of the automated retractable step apparatus of the present invention to provide a powered retractable and deployable step apparatus usable with motor vehicles.

It is an object of the automated retractable step apparatus of the present invention to provide a retractable and deployable step apparatus which can be used with fire trucks and the like for providing access for the entry and exit of passengers therefrom.

It is an object of the automated retractable step apparatus of the present invention to provide an easily deployable step apparatus which can be positioned within the chassis or truck body of a motor vehicle to facilitate access at elevated positions thereto.

It is an object of the automated retractable step apparatus of the present invention to provide a means for facilitating entry and exit of persons from a motor vehicle while being retractable when not being utilized.

It is an object of the automated retractable step apparatus of the present invention which provides a system having minimal maintenance.

It is an object of the automated retractable step apparatus of the present invention which has a minimum number of moving parts.

It is an object of the automated retractable step apparatus of the present invention which is easily maintained.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 1:
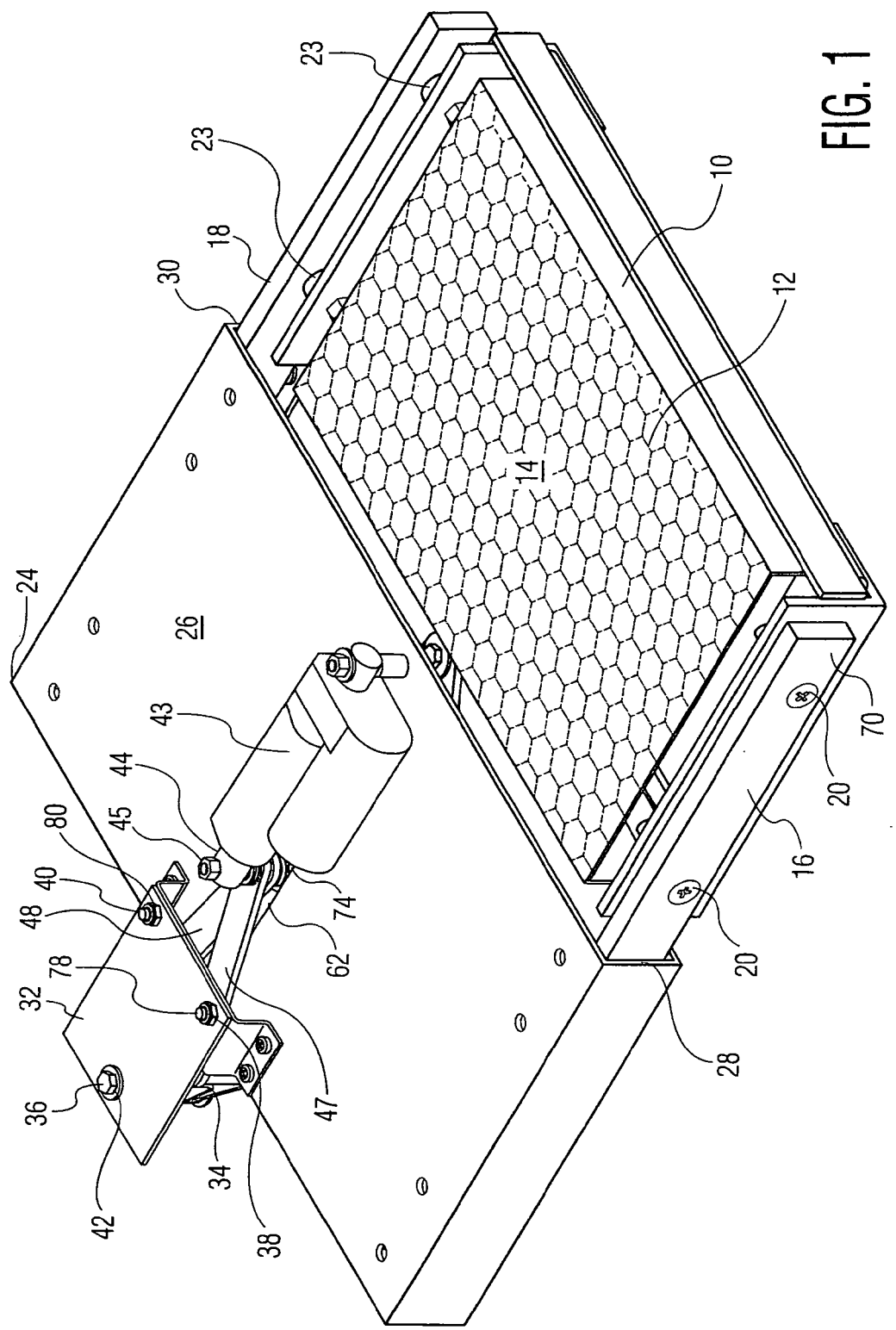
FIG. 1 is a front three-quarter perspective of an illustration of an embodiment of the automated retractable step apparatus of the present invention showing the stepping platform in a deployed or opened position.
Figure 2:
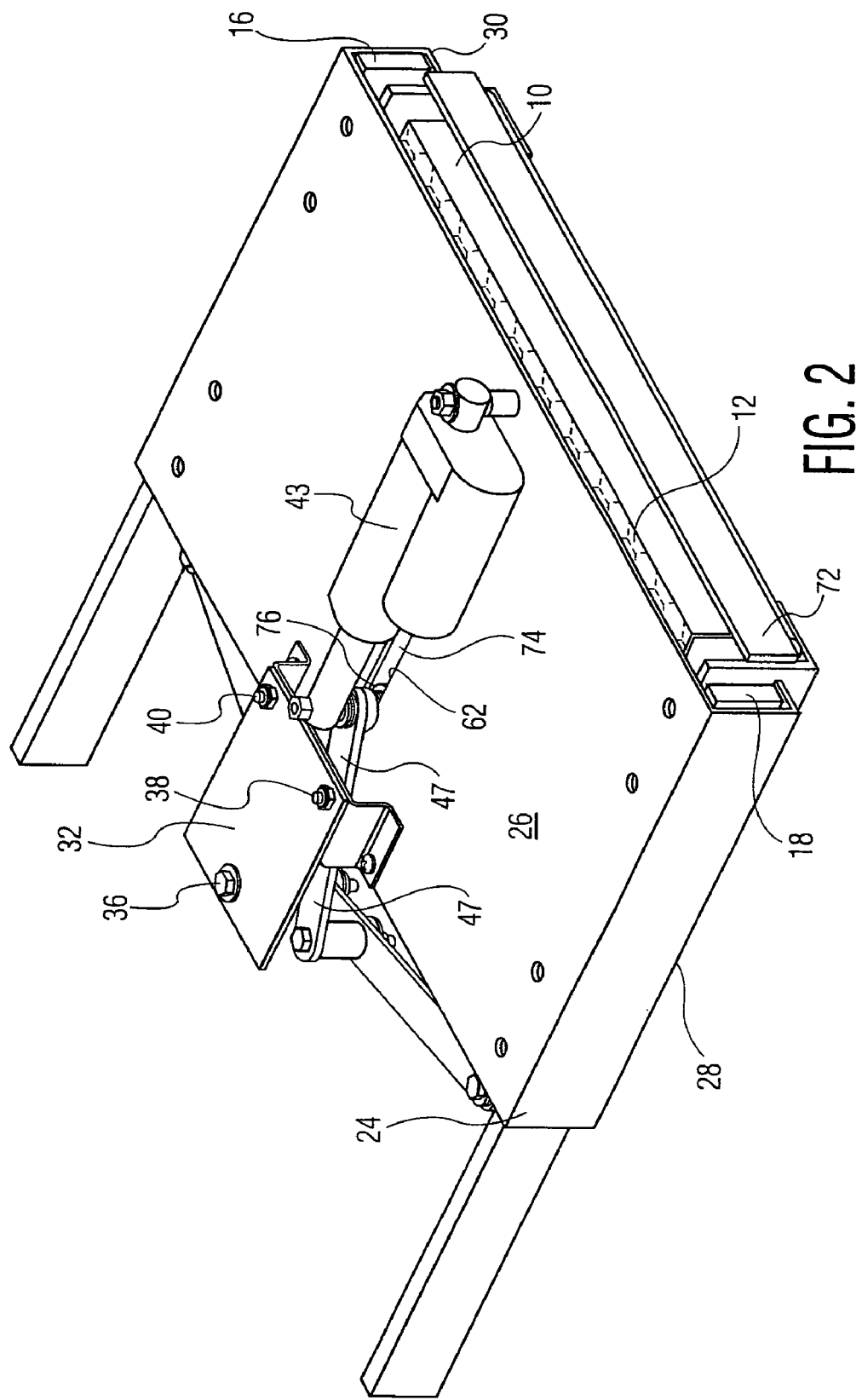
FIG. 2 is a front three-quarter perspective illustration of the embodiment shown in FIG. 1 showing the step in the retracted or closed position.

The automated retractable step apparatus of the present invention includes a step assembly 10 having a stepping platform 12 movably mounted within a housing assembly 24. The stepping platform 12 includes a stepping surface 14 thereon upon which a user can selectively step onto in order to provide access to areas upwardly thereadjacent. The automated retractable step apparatus of the present invention is particularly adaptable to be attached with respect to a vehicle such as an emergency vehicle truck to facilitate entry and exit thereinto or to provide access to elevated portions on such vehicles where items are stored or access is needed for any other reason. The housing assembly preferably includes a primary housing plate 26 with a first guide channel means 28 and a second guide channel means 30 extending downwardly therefrom. These two guide channels 28 and 30 are spaced apart from one another to define therebetween a retaining zone 68 within the housing assembly 24 for holding of the step assembly 10 when in the retracted position and to facilitate movement of the step assembly to the deployed position. The step assembly 10 itself includes a first step support member 16 adapted to engage the first guide channel 28 to facilitate relative movement between the step assembly 10 and the housing 24. Similarly a second step support member 18 is adapted to engage the second guide channel means 30 to further facilitate movement of the step assembly 10 between the extended position 70 extending outwardly from the housing assembly 24 as shown best in FIG. 1 and the retracted position within the housing assembly 24. Step assembly 10, preferably, includes a rear step surface 19 to which linkage may be attached to facilitate movement of the step assembly 10 between the retracted and extended positions 72 and 70. To further facilitate this movement a step bracket 56 may be attached to the rear step surface 19 at one central point or other similar location thereon to facilitate equalized and balanced powering of movement of the step assembly 10 within the first and second guide channels 28 and 30 between positions 70 and 72.

The construction of the step assembly 10 will preferably include a step securement means 20 which is preferably threaded and is adapted to selectively engage or disengage the first step support member 16 with respect to the stepping platform 12. A first spacer means 22 is designed to be positionable between the stepping platform 12 and the first step support member 16 to determine the dimension of spacing therebetween. Spacers 22 can be of any predetermined size as needed for the various required spacings. Furthermore, a second spacer means 23 is preferably included along with another step securement means 20 to determine the lateral spacing between the second step support member 18 and the stepping platform 12 to further facilitate full engagement of the step supports 16 and 18 of the step assembly 10 with respect to the first and second guide channels means 28 and 30.

A pivot support plate 32 is preferably attached with respect to the primary housing plate 26. This pivot support plate 32 preferably defines a first pivot support plate aperture 36 therein and a second pivot support plate aperture 38 therein and a third pivot support plate aperture 40 therewithin. The first pivot support plate aperture 36 is designed to receive and support the pivot pin means 42 extending therethrough and downwardly therefrom. The second and third pivot support plate apertures 38 and 40 are designed to be attached with respect to a mounting bracket 34 which itself is directly attached with respect to the primary housing plate 26 by conventional threaded fasteners such as first securement pin 78 extending through second pivot support plate aperture 38 and second securement pin 80 extending through third pivot support plate aperture 38 for facilitating secure mounting of said pivot support plate 32 with respect to said bracket 34 and with respect to said housing 24.

In this manner the pivot pin 42 will extend from the pivot support plate 32 downwardly from a position above the primary housing plate 26 to a position therebelow to facilitate mounting of linkage with respect thereto to facilitate control of movement of the step platform 10 between the retracted and the extended positions 72 and 70.

A drive means 43 is included which preferably comprises a linear actuator which includes an output shaft 44 which is longitudinally movable responsive to powering of the linear actuator. An output shaft pin 45 is preferably positioned extending through the output shaft 44 and further downwardly through a housing slot 62 defined in the primary housing plate 26. Housing slot 62 preferably includes a first housing slot end 74 and a second housing slot end 76. This housing slot 62 is preferably oriented longitudinally at a direction extending parallel with respect to the direction of movement of the step assembly 10 as it moves between the extended and retracted positions 72 and 70. In this manner the movement of the output shaft 44 of the drive means 43 will be controlled such as to always extend in a direction oriented parallel with respect to the direction of movement of the stepping platform 12 when moving inwardly and outwardly with respect to housing assembly 24. Movement of output shaft pin 45 to the first housing slot end 74 will occur responsive to movement of said step assembly 10 to the extended position 70. Movement of output shaft pin 45 to the second housing slot end 76 will occur responsive to movement of said step assembly 10 to the retracted position 72.

A linkage assembly 46 is also included operative to indirectly attached the output shaft pin 45 with respect to the step bracket 56 and in this manner deliver the power of the linear actuator 43 or drive means to the step assembly 10 to control movement thereof between position 70 and 72.

This linkage assembly 46 preferably includes a first upper linkage arm 47 and a second upper linkage arm 48 both of which are pivotally connected to the output shaft pin 45 at a position above the primary housing plate 26. The linkage assembly 46 also includes a first lower inner link arm 50 which is pivotally attached to the step bracket 56 and extends outwardly therefrom. The linkage assembly also includes a second lower inner link arm 52 which is also pivotally secured with respect to the step bracket 56 and extends outwardly in a direction at an angle with respect thereto and is spatially disposed from the first lower inner link arm 50.

Figure 5:
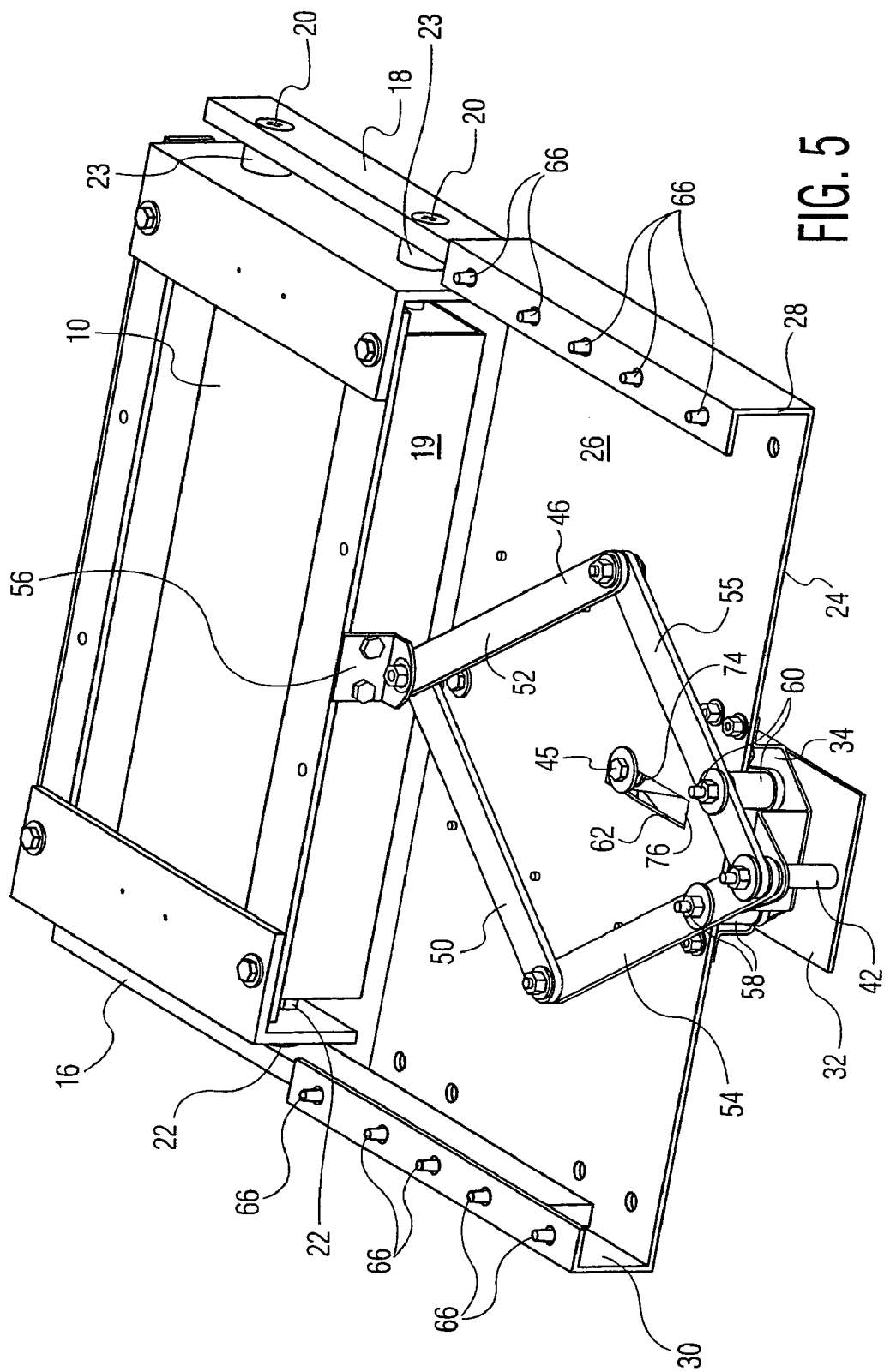
FIG. 5 is a bottom plan view of an embodiment of the present invention showing the lower portion of the linkage and the stepping platform in the deployed position.

The first lower inner link arm 50 is then connected to a first lower outer link arm 54 and the second lower inner link arm 52 is connected to a second lower outer link arm 55. The outwardly most extending ends of each of the first lower outer link arm 54 and the second lower outer link arm 55 are pivotally connected with respect to one another and with respect to the pivot pin 42. In this manner the link arms 50, 52, 54 and 55, as shown best in FIG. 5, define a scissors linkage for effectively and accurately controlling movement of the step assembly 10 between the extended or deployed position 70 and the retracted or stored position 72 responsive to powered movement by the linear actuator 43.

The linkage for actually delivering power for movement of the scissors linkage as defined above is provided by the inclusion of a first lower linkage drive pin 58 which extends from first upper linkage arm 47 to first lower outer link arm 54. This movement is also powered by including a second lower linkage drive pin 60 which extends from the second upper linkage arm 48 to the second lower outer link arm 55. As such, powering of movement by operation of said drive means 43 will cause powered of movement of the first upper linkage arm 47 and the second upper linkage arm 48 thereby further causing respective movement of the first lower outer link arm 54 and the second lower outer link arm 55 as the output shaft pin 45 travels longitudinally within the housing slot 62. This powering will cause expanding of the scissor linkage resulting from the interconnection between linkage parts 50, 52, 54 and 55 to power movement of the step assembly 10 toward the deployed position 70. Reverse movement will cause movement of the step assembly 10 to the closed position 72.

Figure 3:
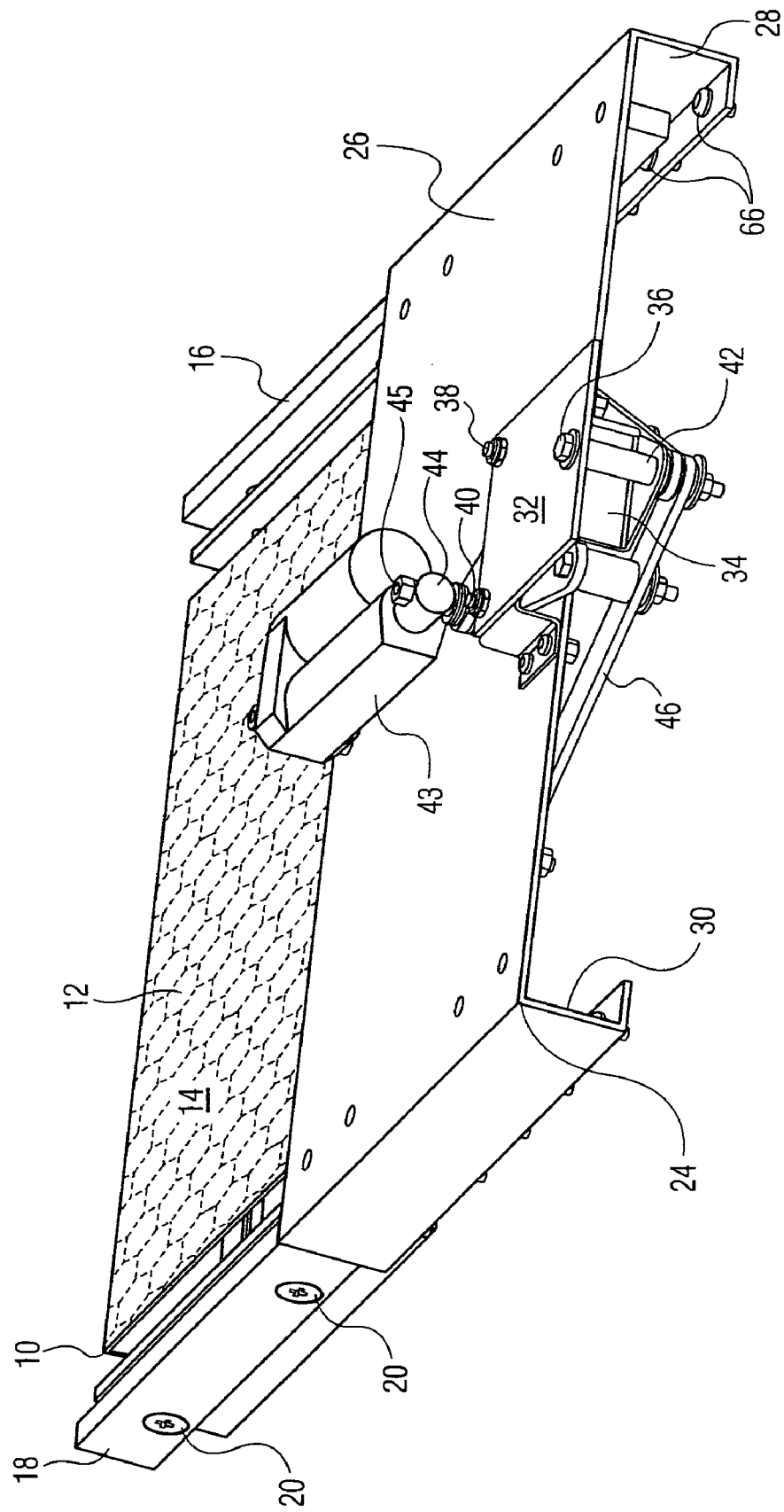
FIG. 3 is a rear perspective illustration of the embodiment shown in FIG. 1.
Figure 4:
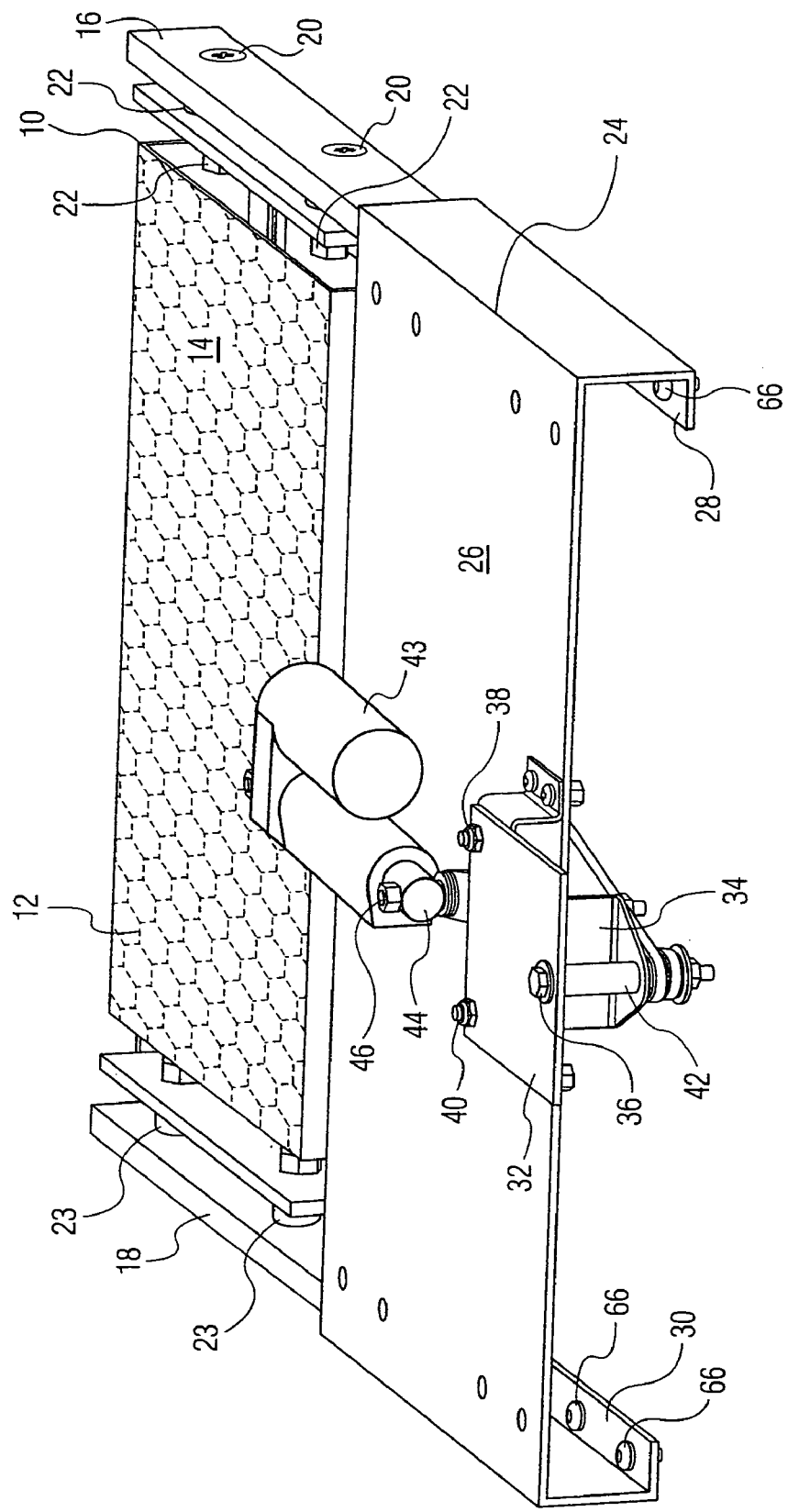
FIG. 4 is a rear perspective illustration similar to the embodiment shown in FIG. 3 however taken from the right.
Figure 6:
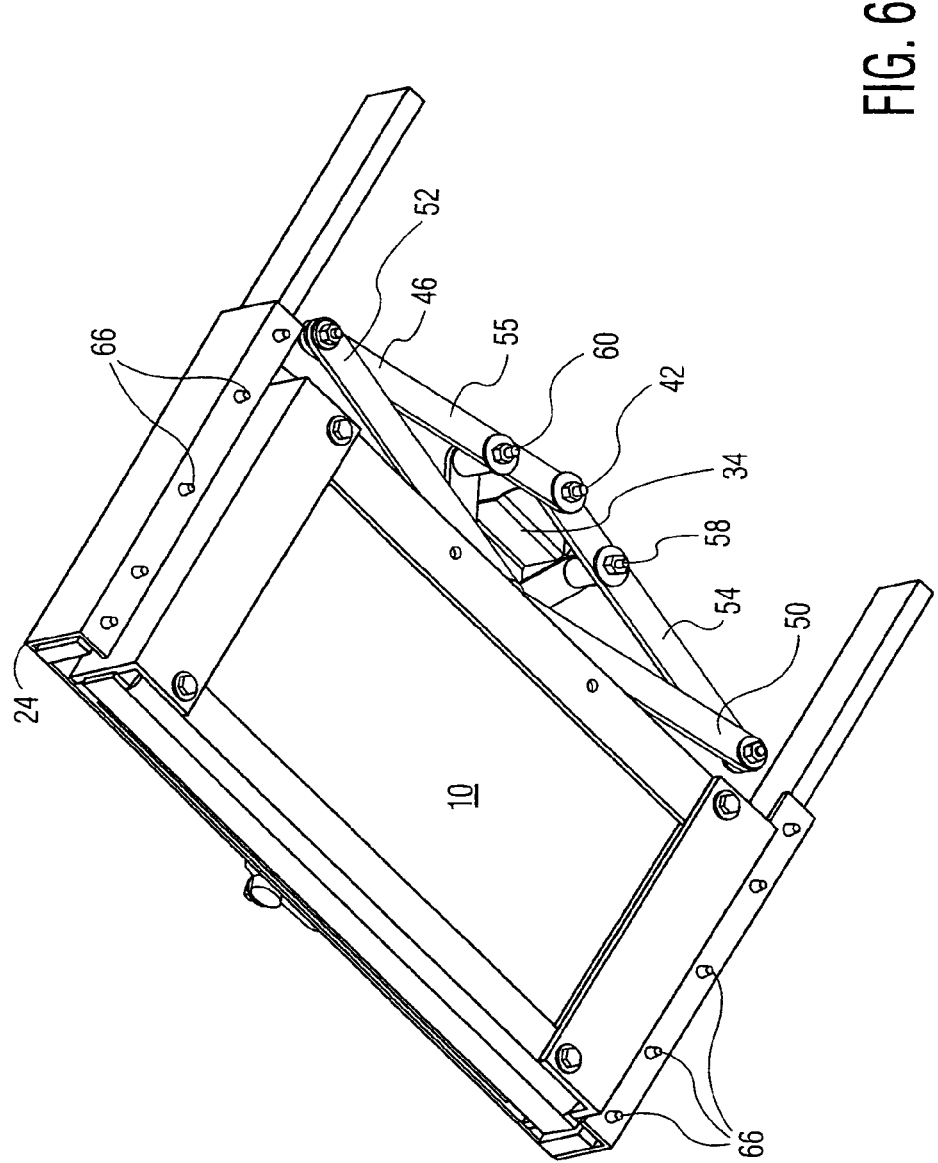
FIG. 6 is similar to the embodiment shown in FIG. 5 with the linkage positioning the stepping platform in the retracted position.
Figure 7:
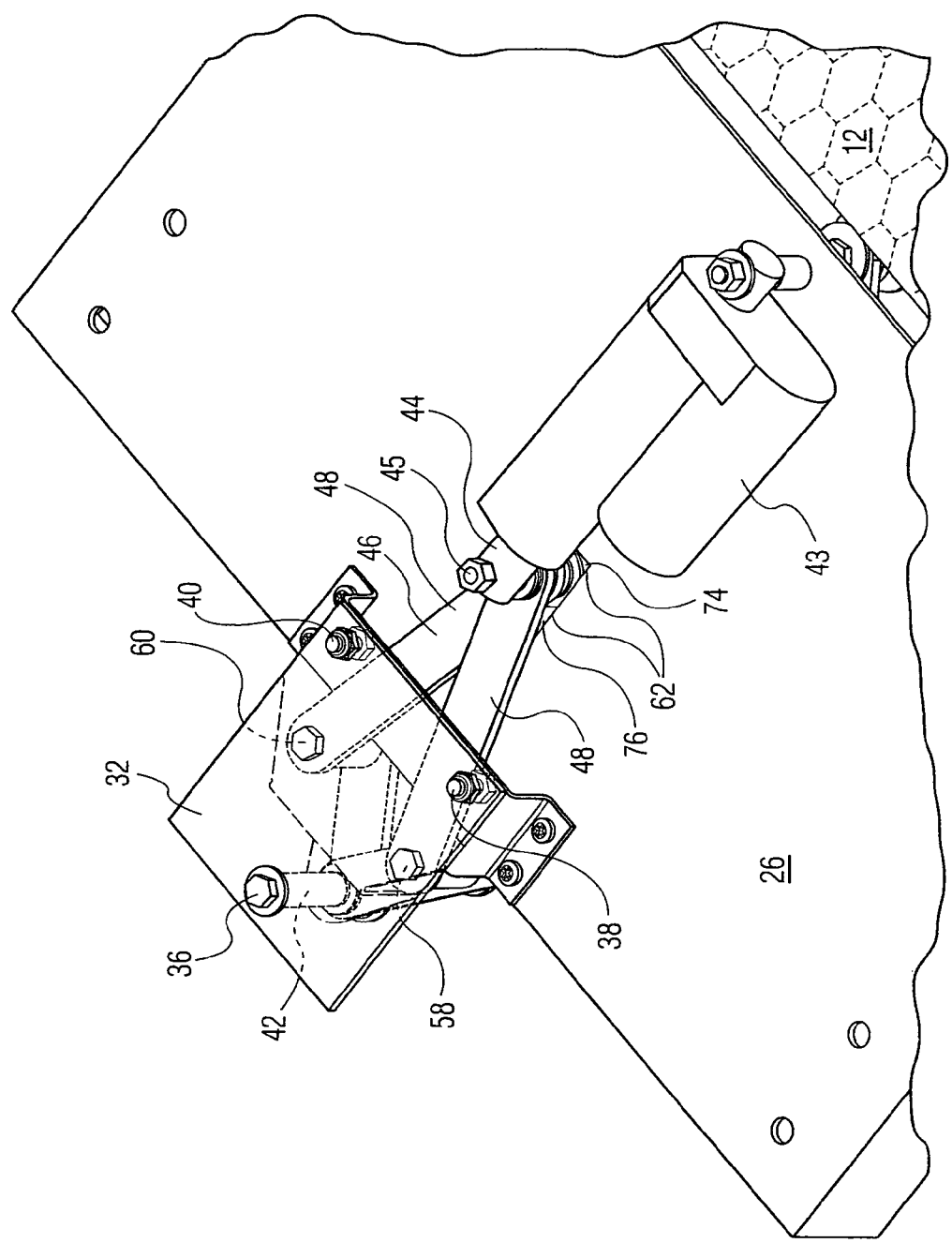
FIG. 7 is an exploded view of the upper portion of the apparatus of the present invention showing the positioning of the upper linkage more clearly by providing the pivot support plate transparent to show the position of the parts thereunder responsive to the stepping assembly being in the deployed position.
Figure 8:
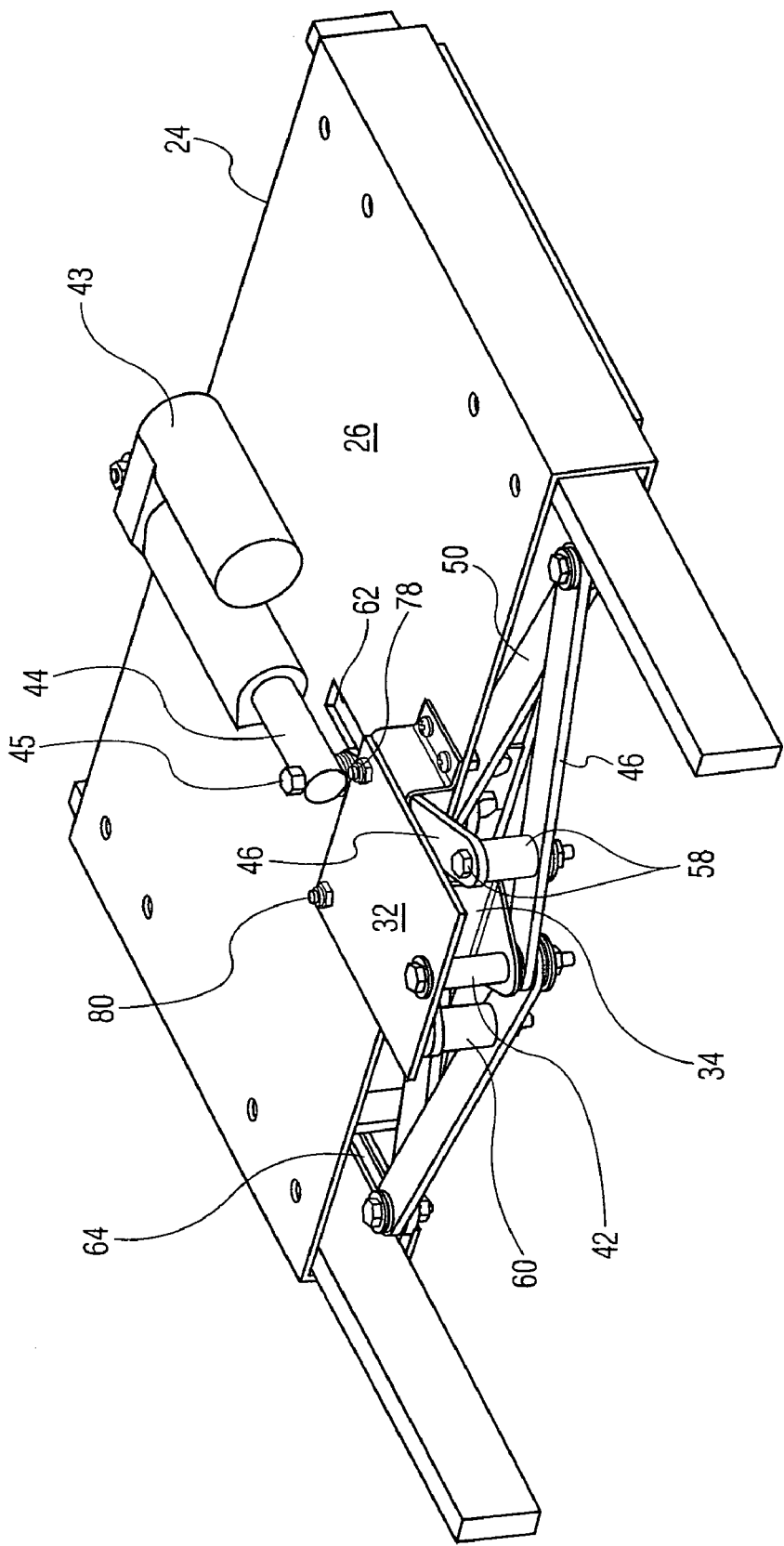
FIG. 8 is a rear perspective view of an alternative embodiment of the present invention making use of an alternative support mechanism within the guide channels.
Figure 9:
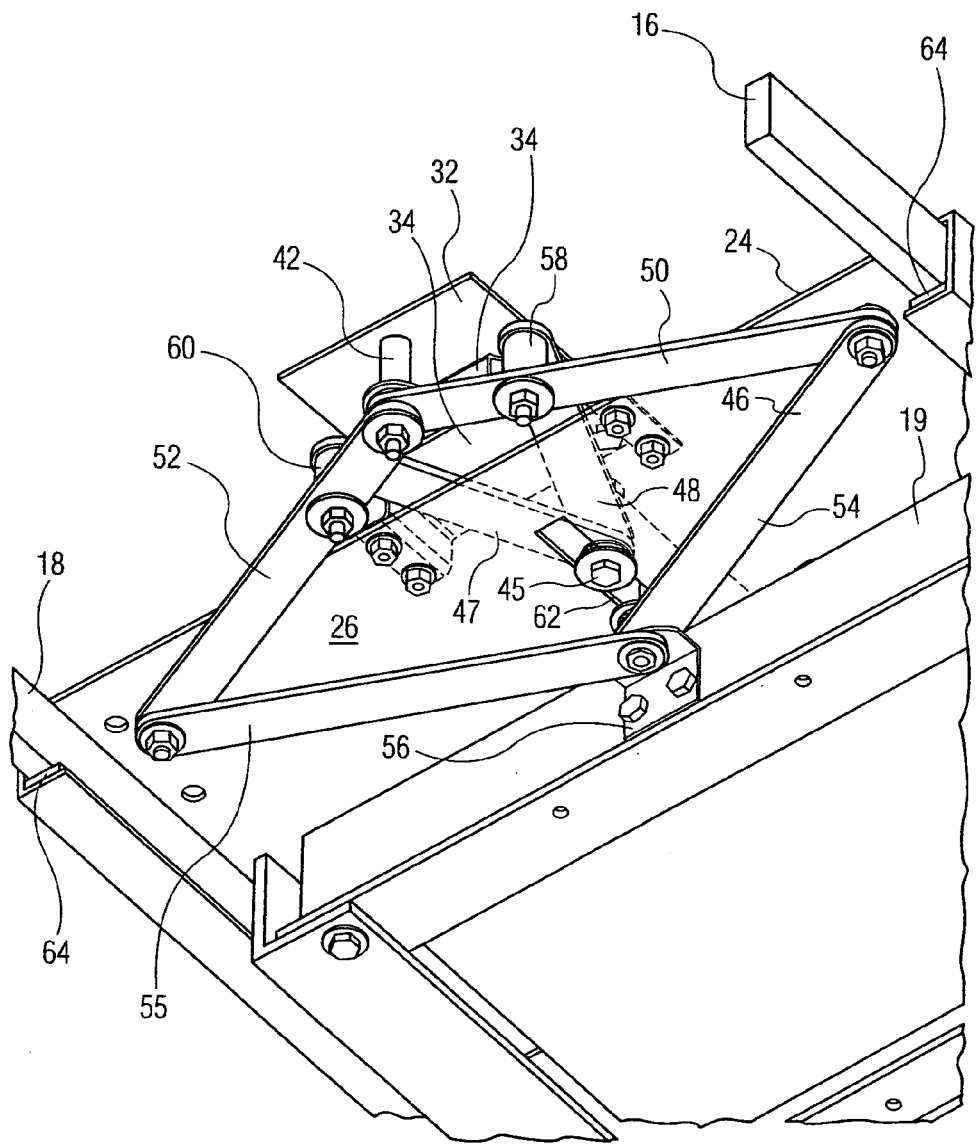
FIG. 9 is a bottom plan view of the configuration shown in FIG. 1 with the lower linkage shown in the retracted position.
Figure 10:
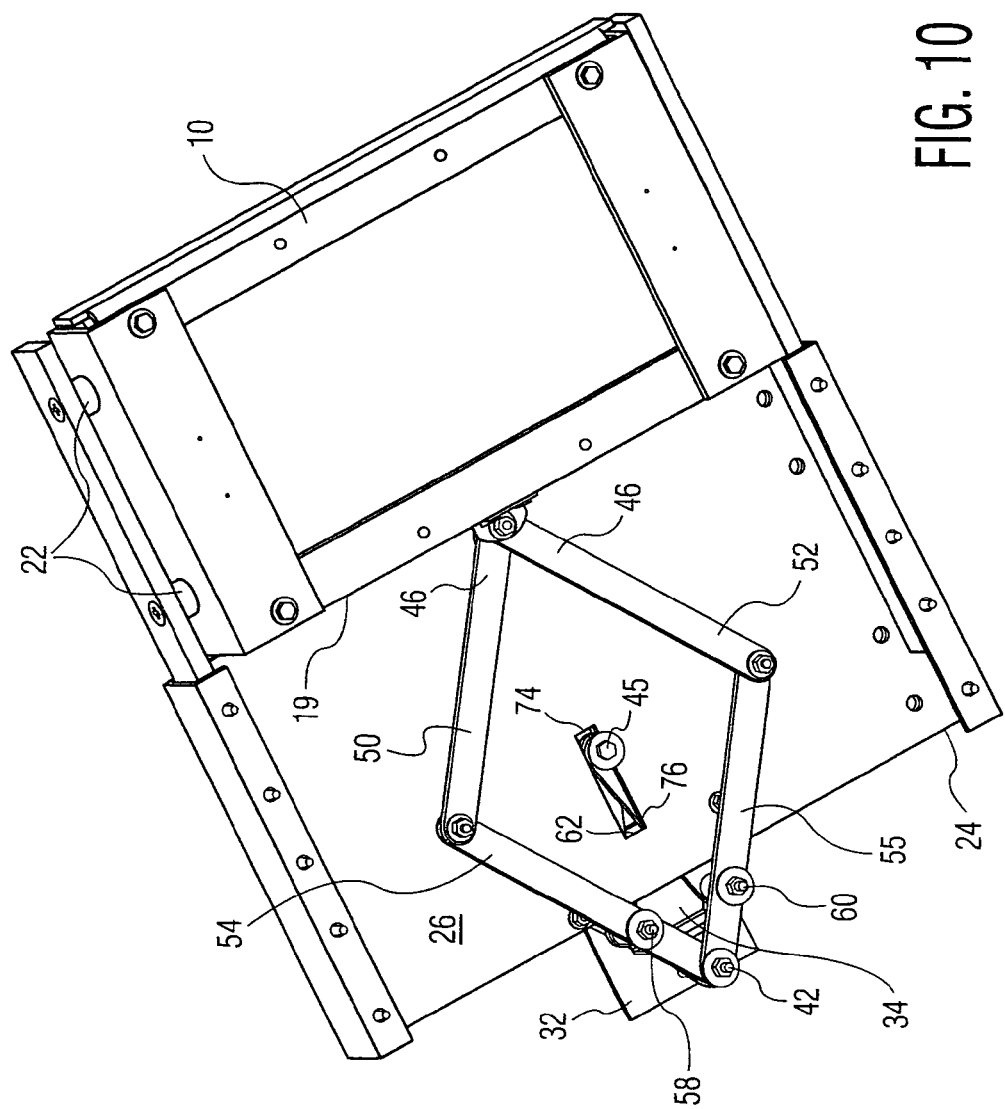
FIG. 10 is a bottom plan view of the embodiment shown in FIG. 8 with the lower linkage shown in the extended position.
Figure 11:
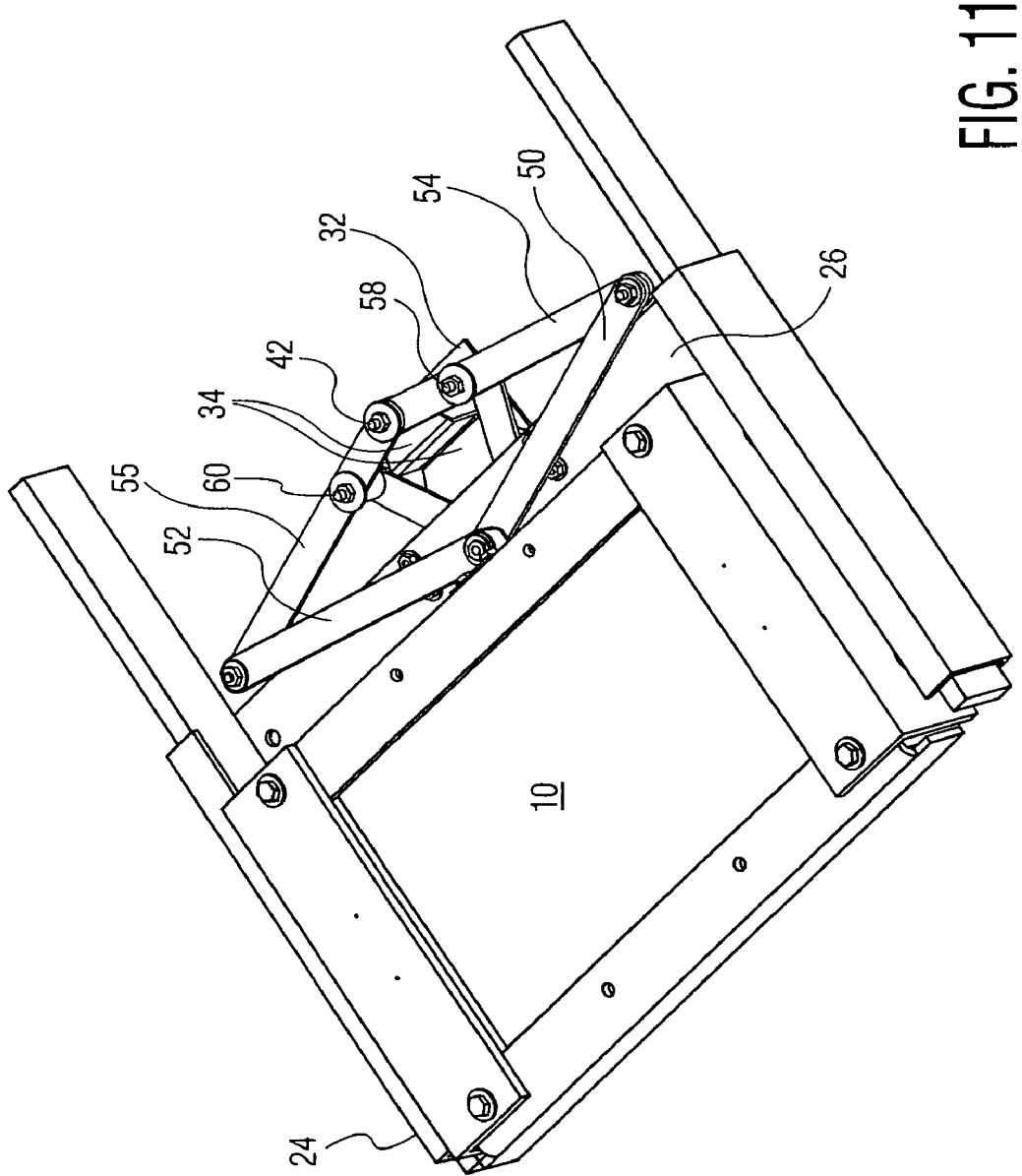
FIG. 11 is a lower plan view of the configuration shown in FIG. 8.
Figure 12:
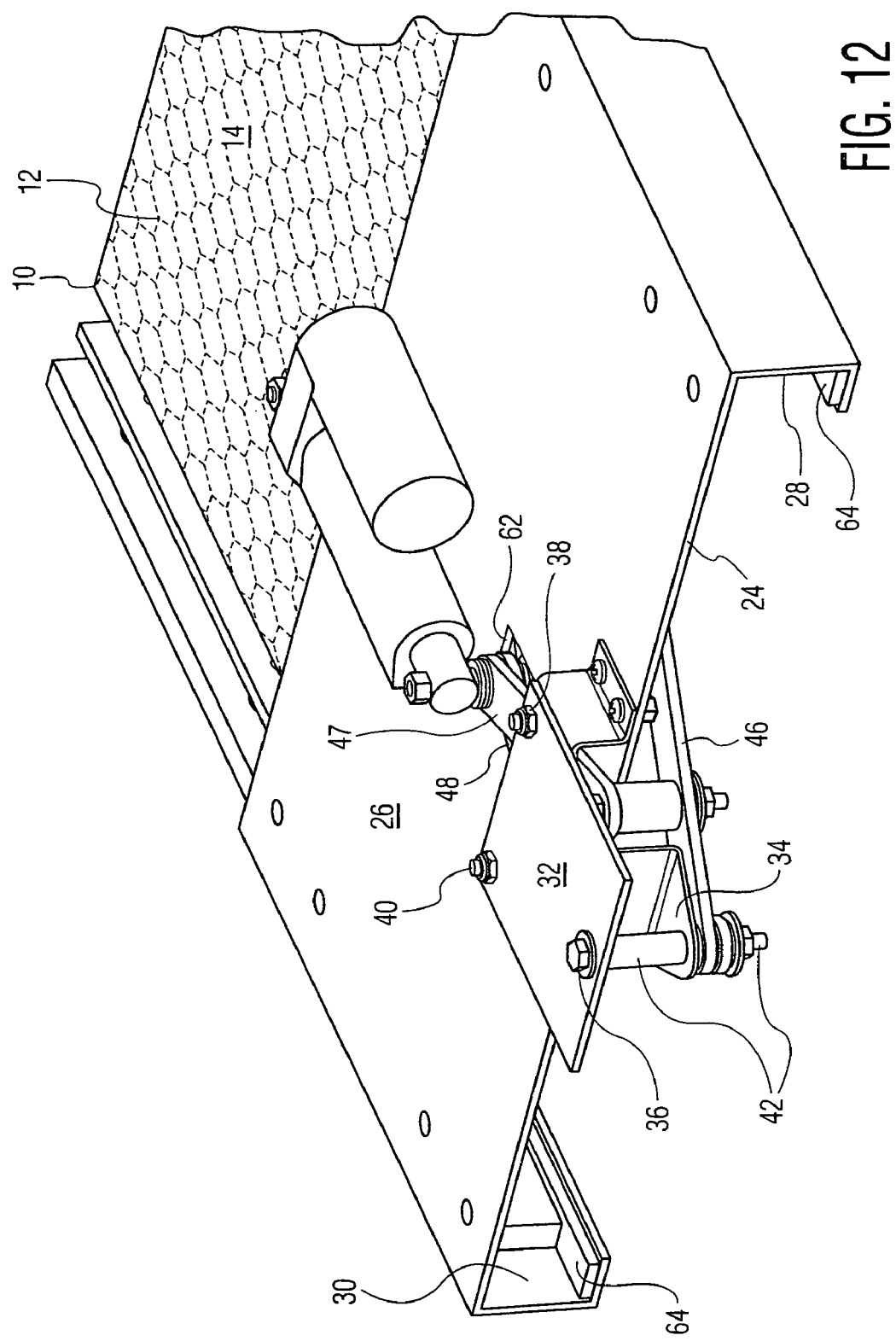
FIG. 12 is a rear perspective view showing the top and bottom linkage and the drive mechanism of the alternative apparatus of FIG. 8 shown in the deployed or extended position.

To facilitate movement of the step assembly 10 and, particularly, of the first and second support members 16 and 18 with respect to the guide channels 28 and 30, respectively, a bearing surface can be positioned therewithin. The present invention discloses two types of bearing surfaces bit it should be appreciated that many configuration of fraction controlled surfaces or materials can be utilized and still come within the contemplated constructions of the present invention. The first surface includes a plurality of individual thermoplastic guide buttons 66, more commonly known as tree rivets, as shown best in FIGS. 3, 5 and 6. It is also possible merely to use a thermoplastic flat guide support 64 which could be made of Teflon or any other low friction material as shown in FIGS. 9, 10, 11 and 12 in the alternative embodiment. As such, the apparatus of the present invention provides a simple basic construction for providing movement an automated retractable step apparatus between the deployed and retracted positions 70 and 72 which utilizes a minimum number of moving parts and can be easily deployed where space is of limited availability especially when considered in the vertical dimension such as is commonly present within emergency vehicles such as fire trucks.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. An automated retractable step apparatus comprising:
   A. a housing assembly defining a retaining zone therewithin, said housing assembly further including:
      (1) a primary housing plate defining a housing slot means extending therethrough, said housing slot means defining a first end therein and further defining a second end therein spatially disposed from said first end;
      (2) a guide channel means extending along said retaining zone defined within said housing assembly;
   B. a step assembly movably engaged with respect to said guide channel means defined within said retaining zone of said housing assembly, said step assembly being movable along said guide channel means between a retracted position within said retaining zone for storage and an extended position extending at least partially outwardly from said retaining zone to facilitate stepping upon said step assembly;
C. a linkage assembly movably attached with respect to said step assembly and being operative to control movement thereof between said retracted position and said extended position, said linkage assembly being adapted to extend through said housing slot means and be movable therealong between said first end thereof and said second end thereof, the movable attachment of said linkage assembly with respect to said step assembly being operative to urge said step assembly to move to the extended position responsive to said linkage assembly being moved to a position within said housing slot means which is adjacent said first end thereof, furthermore the movable attachment of said linkage assembly with respect to said step assembly being operative to urge said step assembly to move to the retracted position responsive to said linkage assembly being moved to a position within said housing slot means which is adjacent said second end thereof; and
D. a drive means operatively attached to said linkage assembly for powering movement thereof operative to power movement of said step assembly between said extended position and said retracted position.

2. An automated retractable step apparatus as defined in claim 1 wherein said housing slot means is longitudinal extending between said first end and said second end thereof and wherein said housing slot means extends longitudinally in a direction oriented approximately parallel to the direction of movement of said step assembly during movement thereof between said retracted position and said extended position.

3. An automated retractable step apparatus as defined in claim 1 wherein said step assembly further comprises a step support means affixed to said step assembly and extending therealong, said step support means being movably engaged with respect to said guide channel means of said housing assembly to facilitating guiding of movement thereof between said retracted position and said extended position.

4. An automated retractable step apparatus as defined in claim 3 wherein said guide channel means comprises:
A. a first guide channel extending longitudinally along said retaining zone to facilitate guiding movement of said step assembly between said retracted position and said extended position; and
B. a second guide channel extending longitudinally along said retaining zone at a position spatially disposed from said first guide channel to facilitate guiding movement of said step assembly between said retracted position and said extended position.

5. An automated retractable step apparatus as defined in claim 4 wherein said step support means includes:
A. a first step support member affixed to and extending longitudinally along said step assembly and engageable with respect to said first guide channel to facilitate guiding movement of said step assembly between said retracted position and said extended position; and
B. a second step support member affixed to and extending longitudinally along said step assembly at a position spatially disposed from said first step support member, said second step support member being engageable with respect to said first guide channel to further facilitate guiding movement of said step assembly between said retracted position and said extended position.

6. An automated retractable step apparatus as defined in claim 5 wherein said step assembly includes:
A. a first spacer means positioned between said first step support member and said step assembly for maintaining desired spacing therebetween and controlling the lateral width of said step assembly to maintain engagement thereof with respect to said first guide channel and said second guide channel; and
B. a second spacer means positioned between said second step support member and said step assembly for maintaining desired spacing therebetween and controlling the lateral width of said step assembly to maintain engagement thereof with respect to said first guide channel and said second guide channel.

7. An automated retractable step apparatus as defined in claim 1 wherein said drive means comprises a linear actuator.

8. An automated retractable step apparatus as defined in claim 1 wherein said housing assembly includes a plurality of thermoplastic guide pins mounted within said guide channel means to facilitate sliding movement of said step assembly during movement thereof with respect to said guide channel means as said step assembly moves between said retracted position and said extended position.

9. An automated retractable step apparatus as defined in claim 1 wherein said housing assembly includes a thermoplastic guide support mounted within said guide channel means to facilitate sliding movement of said step assembly during movement thereof with respect to said guide channel means as said step assembly moves between said retracted position and said extended position.

10. An automated retractable step apparatus as defined in claim 1 wherein said linkage assembly includes:
A. a pivot support plate attached with respect to said housing assembly and extending outwardly therefrom; and
B. a mounting bracket fixedly secured to said housing assembly, said pivot support plate being attached to said housing assembly by being fixedly secured to said mounting bracket and extending outwardly therefrom.

11. An automated retractable step apparatus as defined in claim 10 wherein said mounting bracket is fixedly secured to said primary housing plate of said housing assembly and said support plate is fixedly secured to said mounting bracket.

12. An automated retractable step apparatus as defined in claim 10 wherein said pivot support plate defines a first pivot support plate aperture means and a second pivot support plate aperture means and a third pivot support plate aperture means, said second pivot support plate aperture means and said third pivot support plate aperture means being immediately adjacent said mounting bracket to facilitate securement of said pivot support plate thereto, said first pivot support plate aperture means being positioned spatially disposed from said mounting bracket.

13. An automated retractable step apparatus as defined in claim 12 wherein said linkage assembly further includes a pivot pin means extending through said first pivot support plate aperture means outwardly away from said pivot support plate.

14. An automated retractable step apparatus as defined in claim 12 wherein said linkage assembly further includes:
A. a first securement pin extending through said second pivot support plate aperture means to facilitate securement of said pivot support plate with respect to said mounting bracket; and
B. a second securement pin extending through said third pivot support plate aperture means to further facilitate securement of said pivot support plate with respect to said mounting bracket.

15. An automated retractable step apparatus as defined in claim 13 wherein said linkage assembly includes:
- A. a first lower inner link arm pivotally attached with respect to said step assembly and extending outwardly away therefrom;
- B. a second lower inner link arm pivotally attached with respect to said first lower inner link arm and also pivotally attached with respect to said step assembly, said second lower inner link arm extending outwardly away from said step assembly in a direction spatially disposed from said first lower inner link arm;
- C. a first lower outer link arm pivotally secured to said first lower inner link arm and extending outwardly away therefrom; and
- D. a second lower outer link arm pivotally secured to said second lower inner link arm and extending outwardly away therefrom, said second lower outer link arm and said first lower outer link arm both being pivotally secured with respect to said pivot pin means and with respect to one another.

16. An automated retractable step apparatus as defined in claim 15 wherein said linkage assembly further includes;
- A. a first upper linkage arm pivotally attached to said drive means and extending outwardly therefrom, said first upper linkage arm being movable responsive to actuation of said drive means; and
- B. a second upper linkage arm pivotally attached to said drive means to be movable responsive to actuation thereof, said second upper linkage arm extending outwardly away from said drive means in a direction spatially disposed from said first upper linkage arm.

17. An automated retractable step apparatus as defined in claim 16 wherein said linkage assembly further comprises:
- A. a first lower linkage drive pin attached to said first upper linkage arm to be movable therewith, said first lower linkage drive pin attached to said first lower outer link arm for powering movement of said linkage assembly to facilitate movement of said step assembly between said extended position and said retracted position; and
- B. a second lower linkage drive pin attached to said second upper linkage arm to be movable therewith, said second lower linkage drive pin attached to said second lower outer link arm for powering movement of said linkage assembly to further facilitate movement of said step assembly between said extended position and said retracted position.

18. An automated retractable step apparatus as defined in claim 1 wherein said step assembly includes a rear step surface oriented facing said linkage assembly and wherein said linkage assembly includes a step bracket fixedly secured to said rear step surface and pivotally attached to said first lower inner link arm and said second lower inner link arm to facilitate powering of movement of said step assembly between said extended position and said retracted position.

19. An automated retractable step apparatus comprising:
- A. a housing assembly defining a retaining zone therewithin, said housing assembly further including:
  - (1) a primary housing plate defining a housing slot means extending therethrough, said housing slot means defining a first end therein and further defining a second end therein spatially disposed from said first end, said housing slot means being longitudinal and extending between said first end and said second end thereof;
  - (2) a guide channel means extending along said retaining zone defined within said housing assembly;
- B. a step assembly movably engaged with respect to said guide channel means defined within said retaining zone of said housing assembly, said step assembly being movable along said guide channel means between a retracted position within said retaining zone for storage and an extended position extending at least partially outwardly from said retaining zone to facilitate stepping upon said step assembly, said step assembly including a step support means affixed to said step assembly and extending therealong, said step support means being movably engaged with respect to said guide channel means of said housing assembly to facilitating guiding of movement thereof between said retracted position and said extended position, said step assembly including a rear step surface thereon;
- C. a drive means comprising a linear actuator for powering movement said step assembly between said extended position and said retracted position;
- D. a linkage assembly movably attached with respect to said step assembly and being operative to control movement thereof between said retracted position and said extended position, said linkage assembly being adapted to extend through said housing slot means and be movable therealong between said first end thereof and said second end thereof, the movable attachment of said linkage assembly with respect to said step assembly being operative to urge said step assembly to move to the extended position responsive to said linkage assembly being moved to a position within said housing slot means which is adjacent said first end thereof, furthermore the movable attachment of said linkage assembly with respect to said step assembly being operative to urge said step assembly to move to the retracted position responsive to said linkage assembly being moved to a position within said housing slot means which is adjacent said second end thereof, said linkage assembly including;
  - (1) a pivot support plate attached with respect to said housing assembly and extending outwardly therefrom, said pivot support plate defining a first pivot support plate aperture means and a second pivot support plate aperture means and a third pivot support plate aperture means; and
  - (2) a mounting bracket fixedly secured to said housing assembly, said pivot support plate being attached to said housing assembly by being fixedly secured to said mounting bracket and extending outwardly therefrom, said mounting bracket being fixedly secured to said primary housing plate of said housing assembly and said support plate being fixedly secured to said mounting bracket, said second pivot support plate aperture means and said third pivot support plate aperture means being immediately adjacent said mounting bracket to facilitate securement of said pivot support plate thereto, said first pivot support plate aperture means being positioned spatially disposed from said mounting bracket;
  - (3) a pivot pin means extending through said first pivot support plate aperture means outwardly away from said pivot support plate;
  - (4) a first lower inner link arm pivotally attached with respect to said step assembly and extending outwardly away therefrom;
  - (5) a second lower inner link arm pivotally attached with respect to said first lower inner link arm and also pivotally attached with respect to said step assembly, said second lower inner link arm extending outwardly away from said step assembly in a direction spatially disposed from said first lower inner link arm;
(6) a first lower outer link arm pivotally secured to said first lower inner link arm and extending outwardly away therefrom;
(7) a second lower outer link arm pivotally secured to said second lower inner link arm and extending outwardly away therefrom, said second lower outer link arm and said first lower outer link arm both being pivotally secured with respect to said pivot pin means and with respect to one another;
(8) a first upper linkage arm pivotally attached to said drive means and extending outwardly therefrom, said first upper linkage arm being movable responsive to actuation of said drive means;
(9) a second upper linkage arm pivotally attached to said drive means to be movable responsive to actuation thereof, said second upper linkage arm extending outwardly away from said drive means in a direction spatially disposed from said first upper linkage arm;
(10) a first lower linkage drive pin attached to said first upper linkage arm to be movable therewith, said first lower linkage drive pin attached to said first lower outer link arm for powering movement of said linkage assembly to facilitate movement of said step assembly between said extended position and said retracted position;
(11) a second lower linkage drive pin attached to said second upper linkage arm to be movable therewith, said second lower linkage drive pin attached to said second lower outer link arm for powering movement of said linkage assembly to further facilitate movement of said step assembly between said extended position and said retracted position; and
(12) a step bracket fixedly secured to said rear step surface and pivotally attached to said first lower inner link arm and said second lower inner link arm to facilitate powering of movement of said step assembly between said extended position and said retracted position.

20. An automated retractable step apparatus comprising:
A. a housing assembly defining a retaining zone therewithin, said housing assembly further including:
(1) a primary housing plate defining a housing slot means extending therethrough, said housing slot means defining a first end therein and further defining a second end therein spatially disposed from said first end, said housing slot means being longitudinal and extending between said first end and said second end thereof;
(2) a guide channel means extending along said retaining zone defined within said housing assembly, said guide channel means comprising:
   a. a first guide channel extending longitudinally along said retaining zone to facilitate guiding movement therewithin;
   b. a second guide channel extending longitudinally along said retaining zone at a position spatially disposed from said first guide channel to facilitate guiding movement therewithin;
(3) thermoplastic guide means positioned within said first guide channel and said second guide channel to facilitate gliding movement therealong;
B. a step assembly movably engaged with respect to said guide channel means defined within said retaining zone of said housing assembly, said step assembly being movable along said guide channel means between a retracted position within said retaining zone for storage and an extended position extending at least partially outwardly from said retaining zone to facilitate stepping upon said step assembly, said step assembly including a step support means affixed to said step assembly and extending therealong, said step support means being movably engaged with respect to said guide channel means of said housing assembly to facilitating guiding of movement thereof between said retracted position and said extended position, said step assembly including a rear step surface thereon, said step support means further including:
(1) a first step support member affixed to and extending longitudinally along said step assembly and engageable with respect to said first guide channel to facilitate guiding movement of said step assembly between said retracted position and said extended position; and
(2) a second step support member affixed to and extending longitudinally along said step assembly at a position spatially disposed from said first step support member, said second step support member being engageable with respect to said first guide channel to further facilitate guiding movement of said step assembly between said retracted position and said extended position;
C. a drive means comprising a linear actuator for powering movement said step assembly between said extended position and said retracted position;
D. a linkage assembly movably attached with respect to said step assembly and being operative to control movement thereof between said retracted position and said extended position, said linkage assembly being adapted to extend through said housing slot means and be movable therealong between said first end thereof and said second end thereof, the movable attachment of said linkage assembly with respect to said step assembly being operative to urge said step assembly to move to the extended position responsive to said linkage assembly being moved to a position within said housing slot means which is adjacent said first end thereof, furthermore the movable attachment of said linkage assembly with respect to said step assembly being operative to urge said step assembly to move to the retracted position responsive to said linkage assembly being moved to a position within said housing slot means which is adjacent said second end thereof, said linkage assembly including;
(1) a pivot support plate attached with respect to said housing assembly and extending outwardly therefrom, said pivot support plate defining a first pivot support plate aperture means and a second pivot support plate aperture means and a third pivot support plate aperture means;
(2) a mounting bracket fixedly secured to said housing assembly, said pivot support plate being attached to said housing assembly by being fixedly secured to said mounting bracket and extending outwardly therefrom, said mounting bracket being fixedly secured to said primary housing plate of said housing assembly and said support plate being fixedly secured to said mounting bracket, said second pivot support plate aperture means and said third pivot support plate aperture means being immediately adjacent said mounting bracket to facilitate securement of said pivot support plate thereto, said first pivot support plate aperture means being positioned spatially disposed from said mounting bracket;

(3) a pivot pin means extending through said first pivot support plate aperture means outwardly away from said pivot support plate;
(4) a first lower inner link arm pivotally attached with respect to said step assembly and extending outwardly away therefrom;
(5) a second lower inner link arm pivotally attached with respect to said first lower inner link arm and also pivotally attached with respect to said step assembly, said second lower inner link arm extending outwardly away from said step assembly in a direction spatially disposed from said first lower inner link arm;
(6) a first lower outer link arm pivotally secured to said first lower inner link arm and extending outwardly away therefrom;
(7) a second lower outer link arm pivotally secured to said second lower inner link arm and extending outwardly away therefrom, said second lower outer link arm and said first lower outer link arm both being pivotally secured with respect to said pivot pin means and with respect to one another;
(8) a first upper linkage arm pivotally attached to said drive means and extending outwardly therefrom, said first upper linkage arm being movable responsive to actuation of said drive means;
(9) a second upper linkage arm pivotally attached to said drive means to be movable responsive to actuation thereof, said second upper linkage arm extending outwardly away from said drive means in a direction spatially disposed from said first upper linkage arm;
(10) a first lower linkage drive pin attached to said first upper linkage arm to be movable therewith, said first lower linkage drive pin attached to said first lower outer link arm for powering movement of said linkage assembly to facilitate movement of said step assembly between said extended position and said retracted position;
(11) a second lower linkage drive pin attached to said second upper linkage arm to be movable therewith, said second lower linkage drive pin attached to said second lower outer link arm for powering movement of said linkage assembly to further facilitate movement of said step assembly between said extended position and said retracted position;
(12) a step bracket fixedly secured to said rear step surface and pivotally attached to said first lower inner link arm and said second lower inner link arm to facilitate powering of movement of said step assembly between said extended position and said retracted position;
(13) a first securement pin extending through said second pivot support plate aperture means to facilitate securement of said pivot support plate with respect to said mounting bracket; and
(14) a second securement pin extending through said third pivot support plate aperture means to further facilitate securement of said pivot support plate with respect to said mounting bracket.

* * * * *